US008898788B1

(12) United States Patent
Aziz et al.

(10) Patent No.: US 8,898,788 B1
(45) Date of Patent: Nov. 25, 2014

(54) SYSTEMS AND METHODS FOR MALWARE ATTACK PREVENTION

(75) Inventors: Ashar Aziz, Fremont, CA (US);
Wei-Lung Lai, Cupertino, CA (US);
Jayaraman Manni, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 1369 days.

(21) Appl. No.: 11/717,474

(22) Filed: Mar. 12, 2007

Related U.S. Application Data

(63) Continuation-in-part of application No. 11/494,990, filed on Jul. 28, 2006, now Pat. No. 8,375,444, which is a continuation-in-part of application No. 11/471,072, filed on Jun. 19, 2006, now Pat. No. 8,584,239, which is a continuation-in-part of application No. 11/409,355, filed on Apr. 20, 2006, now Pat. No. 8,171,553, which is a continuation-in-part of application No. 11/152,286, filed on Jun. 13, 2005, now Pat. No. 8,006,305, said application No. 11/409,355 is a continuation-in-part of application No. 11/151,812, filed on Jun. 13, 2005, now Pat. No. 8,549,638, and a continuation-in-part of application No. 11/096,287, filed on Mar. 31, 2005, now Pat. No. 8,528,086.

(60) Provisional application No. 60/579,910, filed on Jun. 14, 2004, provisional application No. 60/579,953, filed on Jun. 14, 2004, provisional application No. 60/559,198, filed on Apr. 1, 2004.

(51) Int. Cl.
G06F 11/30 (2006.01)
H04L 29/06 (2006.01)
G06F 21/00 (2013.01)

(52) U.S. Cl.
CPC ............... *G06F 21/00* (2013.01); *H04L 63/00* (2013.01)

USPC ............................................. 726/24; 726/23

(58) Field of Classification Search
USPC .......... 380/270, 255, 247; 713/150, 100, 182, 713/188, 189; 726/26, 27, 28, 29, 30
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 | 1/2008 |
| WO | 0206928 A2 | 1/2002 |

(Continued)

OTHER PUBLICATIONS

IEEE Xplore Digital Library Search results for "detection of unknown computer worms". http://ieeexplore.ieee.org/search/searchresult.jsp?SortField=Score&SortOrder=desc&ResultC . . . Accessed on Aug. 28, 2009.

(Continued)

*Primary Examiner* — Jeffrey Pwu
*Assistant Examiner* — Nega Woldemariam
(74) *Attorney, Agent, or Firm* — Blakely, Sokoloff, Taylor & Zafman LLP

(57) ABSTRACT

Systems and methods for malware attack prevention are provided. Network data is copied from a communication network. It is then determined if a possible malware attack is within the copied network data. The network data is intercepted based on the determination. The network data is then analyzed to identify a malware attack.

90 Claims, 7 Drawing Sheets

(56) References Cited

U.S. PATENT DOCUMENTS

| | | | |
|---|---|---|---|
| 5,440,723 A | 8/1995 | Arnold et al. | |
| 5,490,249 A | 2/1996 | Miller | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,269,330 B1 | 7/2001 | Cidon et al. | |
| 6,279,113 B1 | 8/2001 | Vaidya | |
| 6,298,445 B1 | 10/2001 | Shostack | |
| 6,357,008 B1 | 3/2002 | Nachenberg | |
| 6,424,627 B1 | 7/2002 | Sørhaug et al. | |
| 6,484,315 B1 | 11/2002 | Ziese | |
| 6,487,666 B1 * | 11/2002 | Shanklin et al. | 726/23 |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel | |
| 7,231,667 B2 | 6/2007 | Jordan | |
| 7,240,364 B1 | 7/2007 | Branscomb et al. | |
| 7,240,368 B1 | 7/2007 | Roesch | |
| 7,251,215 B1 | 7/2007 | Turner et al. | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,356,736 B2 | 4/2008 | Natvig | |
| 7,386,888 B2 | 6/2008 | Liang | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen | |
| 7,496,961 B2 | 2/2009 | Zimmer et al. | |
| 7,519,990 B1 | 4/2009 | Xie | |
| 7,523,493 B2 | 4/2009 | Liang | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,568,233 B1 | 7/2009 | Szor et al. | |
| 7,603,715 B2 | 10/2009 | Costa | |
| 7,607,171 B1 | 10/2009 | Marsden et al. | |
| 7,639,714 B2 | 12/2009 | Stolfo et al. | |
| 7,644,441 B2 | 1/2010 | Schmidt et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,204,984 B1 | 6/2012 | Aziz et al. | |
| 8,220,055 B1 | 7/2012 | Kennedy | |
| 8,225,373 B2 | 7/2012 | Kraemer | |
| 8,234,640 B1 | 7/2012 | Fitzgerald et al. | |
| 8,266,091 B1 | 9/2012 | Gubin et al. | |
| 8,291,499 B2 | 10/2012 | Aziz et al. | |
| 8,312,545 B2 | 11/2012 | Tuvell et al. | |
| 8,321,941 B2 | 11/2012 | Tuvell et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,479,174 B2 | 7/2013 | Chiriac | |
| 8,510,827 B1 | 8/2013 | Leake et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,239 B2 | 11/2013 | Aziz et al. | |
| 8,635,696 B1 | 1/2014 | Aziz | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0166063 A1 | 11/2002 | Lachman et al. | |
| 2002/0184528 A1 * | 12/2002 | Shevenell et al. | 713/201 |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron | |
| 2003/0200460 A1 | 10/2003 | Morota et al. | |
| 2003/0212902 A1 | 11/2003 | van der Made | |
| 2003/0229801 A1 | 12/2003 | Kouznetsov et al. | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel | |
| 2004/0093513 A1 | 5/2004 | Cantrell et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder | |
| 2004/0249911 A1 | 12/2004 | Alkhatib | |
| 2004/0255161 A1 | 12/2004 | Cavanaugh | |
| 2004/0268147 A1 | 12/2004 | Wiederin et al. | |
| 2005/0033960 A1 | 2/2005 | Vialen et al. | |
| 2005/0033989 A1 | 2/2005 | Poletto | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo | |
| 2005/0091533 A1 | 4/2005 | Omote et al. | |
| 2005/0108562 A1 | 5/2005 | Khazan et al. | |
| 2005/0114663 A1 | 5/2005 | Cornell | |
| 2005/0125195 A1 | 6/2005 | Brendel | |
| 2005/0149726 A1 | 7/2005 | Joshi et al. | |
| 2005/0157662 A1 | 7/2005 | Bingham et al. | |

(56) References Cited

U.S. PATENT DOCUMENTS

| | | |
|---|---|---|
| 2005/0183143 A1 | 8/2005 | Anderholm |
| 2005/0201297 A1 | 9/2005 | Peikari |
| 2005/0210533 A1 | 9/2005 | Copeland |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani |
| 2006/0101516 A1 | 5/2006 | Sudaharan |
| 2006/0101517 A1 | 5/2006 | Banzhof et al. |
| 2006/0117385 A1 | 6/2006 | Mester et al. |
| 2006/0123477 A1 | 6/2006 | Raghavan |
| 2006/0143709 A1 | 6/2006 | Brooks et al. |
| 2006/0150249 A1* | 7/2006 | Gassen et al. ............... 726/23 |
| 2006/0161983 A1 | 7/2006 | Cothrell |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0101435 A1 | 5/2007 | Konanka et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz |
| 2007/0271446 A1 | 11/2007 | Nakamura |
| 2008/0005782 A1 | 1/2008 | Aziz |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134334 A1 | 6/2008 | Kim et al. |
| 2008/0141376 A1 | 6/2008 | Clausen |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane |
| 2009/0013408 A1 | 1/2009 | Schipka |
| 2009/0031423 A1 | 1/2009 | Liu et al. |
| 2009/0083369 A1 | 3/2009 | Marmor |
| 2009/0083855 A1 | 3/2009 | Apap et al. |
| 2009/0089879 A1 | 4/2009 | Wang |
| 2009/0094697 A1 | 4/2009 | Provos et al. |
| 2009/0126015 A1 | 5/2009 | Monastyrsky et al. |
| 2009/0126016 A1 | 5/2009 | Sobko et al. |
| 2009/0144823 A1 | 6/2009 | Lamastra et al. |
| 2009/0193293 A1 | 7/2009 | Stolfo et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0054278 A1 | 3/2010 | Stolfo et al. |
| 2010/0077481 A1 | 3/2010 | Polyakov et al. |
| 2010/0083376 A1 | 4/2010 | Pereira |
| 2010/0115621 A1 | 5/2010 | Staniford et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0247072 A1 | 10/2011 | Staniford et al. |
| 2011/0307955 A1 | 12/2011 | Kaplan et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0222121 A1 | 8/2012 | Staniford et al. |
| 2012/0297489 A1 | 11/2012 | Dequevy |
| 2013/0014259 A1 | 1/2013 | Gribble et al. |
| 2013/0036472 A1 | 2/2013 | Aziz |
| 2013/0047257 A1 | 2/2013 | Aziz |
| 2013/0227691 A1 | 8/2013 | Aziz et al. |
| 2013/0291109 A1 | 10/2013 | Staniford et al. |

FOREIGN PATENT DOCUMENTS

| | | |
|---|---|---|
| WO | WO0223805 A2 | 3/2002 |
| WO | WO-2008/041950 | 4/2008 |
| WO | WO-2012145066 | 10/2012 |

OTHER PUBLICATIONS

AltaVista Advanced Search Results. "Event Orchestrator". http://www.altavista.com/web/results?itag=ody&pg=aq&aqmode=s&aqa=Event+Orchestrator . . . Accessed on Sep. 3, 2009.

AltaVista Advanced Search Results. "attack vector identifier". http://www.altavista.com/web/results?itag=ody&pg=aq&aqmode=s&aqa=attack+vector+ide . . . Accessed on Sep. 15, 2009.

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos:Control Data Attack Prevention Orthognal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, C. et al., "Honeycomb—Creating Intrusion Detection Signatures Using Honeypots," 2nd Workshop on Hot Topics in Networks (HotNets-11) 2003, Boston, USA.

Newsome, J. et al., "Polygraph: Automatically Generating Signatures for Polymorphic Worms," In Proceedings of the IEEE Symposium on Security and Privacy, May 2005.

(56) References Cited

OTHER PUBLICATIONS

Newsome, J. et al., "Dynamic Taint Analysis for Automatic Detection, Analysis, and Signature Generation of Exploits on Commodity Software," In Proceedings of the 12th Annual Network and Distributed System Security, Symposium (NDSS '05), Feb. 2005.
Singh, S. et al., "Automated Worm Fingerprinting," Proceedings of the ACM/USENIX Symposium on Operating System Design and Implementation, Dec. 2004, San Francisco, California.
Margolis, P.E., Random House Webster's "Computer & Internet Dictionary 3rd Edition," ISBN 0375703519, Dec. 1998.
Whyte et al. "DNS-Based Detection of Scannin Works in an Enterprise Network," Proceedings of the 12th Annual Network and Distributed System Security Symposium, Feb. 2005. 15 pages.
Kristoff, J. "Botnets, Detection and Mitigation: DNS-Based Techniques," NU Security Day 2005, 23 pages.
Silicon Defense, "Worm Containment in the Internal Network", Mar. 2003, pp. 1-25.
Nojiri, D. et al., "Cooperative Response Strategies for Large Scale Attack Mitigation", DARPA Information Survivability Conference and Exposition, Apr. 22-24, 2003, vol. 1, pp. 293-302.
Moore, D. et al., "Internet Quarantine: Requirements for Containing Self-Propagating Code", INFOCOM, Mar. 30-Apr. 3, 2003, vol. 3, pp. 1901-1910.
Williamson, Matthew M., "Throttling Viruses: Restricting Propagation to Defeat Malicious Mobile Code", ACSAC Conference, Dec. 2002, Las Vegas, NV, USA, pp. 1-9.
"Packet", Microsoft Computer Dictionary, Microsoft Press, Mar. 2002, 1 pg.
International Search Report and Written Opinion mailed May 10, 2012 in Application No. PCT/US12/21916.
International Search Report and Written Opinion mailed May 25, 2012 in Application No. PCT/US12/26402.
Cisco, Configuring the Catalyst Switched Port Analyzer (SPAN) ("Cisco") (1992-2003, Cisco Systems).
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Excerpt regarding First Printing Date for Merike Kaeo, Designing Network Security ("Kaeo") (Copyright 2005).
*The Sniffers's Guide to Raw Traffic* available at: yuba.stanford.edu/~casado/pcap/section1.html (Jan. 6, 2014).
"Network Security: NetDetector—Network Intrusion Forensic System (NIFS) Whitepaper", (*"NetDetector Whitepaper"*) (Copyright 2003).
"When Virtual is Better Than Real", IEEEXplore Digital Library, available at, http://ieeexplore.ieee.org/xpl/articleDetails.jsp?reload=true&arnumber=990073 (Dec. 7, 2013).
Adetoye, Adedayo , et al., "Network Intrusion Detection & Response System", ("Adetoye") (Sep. 2003).
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", *J Comput Virol*, Springer-Verlag, France., (2006), pp.67-77.
Boubalos, Chris , "extracting syslog data out of raw pcap dumps, seclists.org, Honeypots mailing list archives", available at http://seclists.org/honeypots/2003/q2/319 ("Boubalos") Jun. 5, 2003.
Cohen, M.I. , "PyFlag—An advanced network forensic framework", *Digital investigation 5*, Elsevier, (2008), pp. S112-S120.
Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation*, USENIX Association, ("Dunlap") (Dec. 9, 2002).
Kaeo, Merike , "Designing Network Security", ("Kaeo") (Nov. 2003).
King, Samuel T., et al., "Operating System Support for Virtual Machines", ("King").
Krasnyansky, Max , et al., Universal TUN/TAP driver, available at https://www.kernel.org/doc/Documentation/networking/tuntap.txt (2002) ("Krasnyansky").
Liljenstam, Michael , et al., "Simulating Realistic Network Traffic for Worm Warning System Design and Testing", *Institute for Security Technology studies* Dartmouth College, ("Liljenstam") (Oct. 27, 2003).
Marchette, David J., "Computer Intrusion Detection and Network Monitoring: A Statistical Viewpoint", ("Marchette") (2001).
Natvig, Kurt , "SandboxII: Internet", Virus Bulletin Conference, ("Natvig") (Sep. 2002).
Peter M. Chen, and Brian D. Noble , "When Virtual Is Better Than Real, Department of Electrical Engineering and Computer Science", University of Michigan ("Chen").
Spitzner, Lance , "Honeypots: Tracking Hackers", ("Spizner") (Sep. 17, 2002).
Thomas H. Ptacek, and Timothy N. Newsham , "Insertion, Evasion, and Denial of Service: Eluding Network Intrusion Detection", Secure Networks, ("Ptacek") (Jan. 1998).
Venezia, Paul , "NetDetector Captures Intrusions", InfoWorld Issue 27, ("Venezia") (Jul. 14, 2003).
Aura, Tuomas, Thomas A. Kuhn, and Michael Rose. "Scanning electronic documents for personally identifiable information." Proceedings of the 5th ACM workshop on Privacy in electronic society. ACM, 2006.
Filiol, Eric, et al. "Combinational Optimisation of Worm Propagation on an Unknown Network," International Journal of Computer Science 2.2 (2007).
Deutsch, P. and J.L. Gailly. "Zlib compressed data format specification version 3.3", RFC 1950, (1996).
Abdullah, et al., Visualizing Network Data for Intrusion Detection, 2005 IEEE Workshop on Information Assurance and Security, pp. 100-108.
Apostolopoulos, George; Hassapis, Constantinos; :"V-eM: A Cluster of Virtual Machines for Robust, Detailed, and High-Performance Network Emulation", 14th IEEE International Symposium on Modeling, Analysism and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International on Signal Processing and Information Technology, Dec. 21, 2005, pp. 233-238.
NetBIOS Working Group. Protocol Standard for a NetBIOS Service on a TCP/UDP transport: Concepts and Methods. STD 19, RFC 1001, Mar. 1987.
United States Patent and Trademark Office, Before the Patent Trial and Appeal Board, *Finjan, Inc.*, Petitioner v. *Fireeye, Inc.*, Patent Owner., Case IPR2014-00344, Patent 8,291,499 B2, Before Bryan F. Moore, Lynne E. Pettigrew, and Francis L. Ippolito, Administrative Patent Judges., Ippolito, Administrative Patent Judge., Decision, Institution of Inter Partes Review, 37 C.F.R. 42.108, Entered: Jul. 21, 2014, 36 pages.

* cited by examiner

SYSTEMS AND METHODS FOR MALWARE ATTACK PREVENTION

CROSS-REFERENCE TO RELATED APPLICATIONS

This application is a continuation-in-part of U.S. patent application Ser. No. 11/494,990, filed Jul. 28, 2006, entitled "Dynamic Signature Creation and Enforcement", which is a continuation-in-part of U.S. patent application Ser. No. 11/471,072, filed Jun. 19, 2006, entitled "Virtual Machine with Dynamic Data Flow Analysis", which is a continuation-in-part of U.S. patent application Ser. No. 11/409,355, filed Apr. 20, 2006, entitled "Heuristic Based Capture with Replay to Virtual Machine", which claims benefit to U.S. patent application Ser. No. 11/096,287, filed Mar. 31, 2005, entitled "System and Method of Detecting Computer Worms," U.S. patent application Ser. No. 11/151,812, filed Jun. 13, 2005, entitled "System and Method of Containing Computer Worms," and U.S. patent application Ser. No. 11/152,286, Jun. 13, 2005, entitled "Computer Worm Defense System and Method" all of which are incorporated by reference herein.

U.S. patent application Ser. No. 11/096,287, filed Mar. 31, 2005, entitled "System and Method of Detecting Computer Worms," claims benefit to provisional patent application No. 60/559,198, filed Apr. 1, 2004, entitled "System and Method of Detecting Computer Worms." U.S. patent application Ser. No. 11/151,812, filed Jun. 13, 2005, entitled "System and Method of Containing Computer Worms," claims benefit of provisional patent application No. 60/579,953, filed Jun. 14, 2004, entitled "System and Method of Containing Computer Worms." U.S. patent application Ser. No. 11/152,286, filed Jun. 13, 2005, entitled "Computer Worm Defense System and Method," claims benefit of provisional patent application No. 60/579,910, filed Jun. 14, 2004, entitled "Computer Worm Defense System and Method." The above-referenced provisional patent applications are also incorporated by reference herein.

This application is also related to U.S. patent application Ser. No. 11/717,408, filed Mar. 12, 2007, entitled "Malware Containment and Security Analysis on Connection", U.S. patent application Ser. No. 11/717,475, filed Mar. 12, 2007, entitled "Malware Containment on Connection", and U.S. patent application Ser. No. 11/717,476, filed Mar. 12, 2007, entitled "Systems and Methods for Malware Attack Detection and Identification". The above-referenced related nonprovisional patent applications are also incorporated by reference herein.

BACKGROUND OF THE INVENTION

1. Field of the Invention

The present invention relates generally to network security. More particularly, the present invention relates to malware attack prevention.

2. Background Art

Presently, malicious software (i.e., malware), can attack various devices via a network. For example, malware may include any program or file that is harmful to a computer user, such as computer viruses, worms, Trojan horses, spyware, or any programming that gathers information about a computer user without permission. Various processes and devices have been employed to prevent the problems that malware can cause.

For example, client devices often include malware scanning software that scans a particular client device for malware. The scanning may be performed based on a schedule specified by a user associated with the particular device, by a system administrator, and so forth. Unfortunately, by the time the malware is detected by the scanning software, some damage on the particular client device may have already occurred.

Another option for preventing malware is a honey pot. A honey pot is a computer system on the Internet that is expressly set up to attract and "trap" a user that attempts to penetrate other users' computer systems. The user can include a hacker, a cracker, or a script kiddy. The honey pot records the activities of the user invading the other users' computer systems. Disadvantageously, as the honey pot is being invaded, so too are other users' computer systems on the same network. Thus, other users' computer systems may be harmed while the honey pot determines the nature of the malware invading the honey pot's own computer system.

One disadvantage of the "honey pot" approach is the passive nature of the trap. Generally, honey pots comprise a static IP address. The user of the honey pot tries to attract attention to make the honey pot an attractive target to hackers, crackers, and script kiddies. The user of the honey pot will also reduce security on the machine as to allow attackers access so as to track the user's attack by recording the attack vector (i.e., vulnerability exploited to attack the honey pot) and the payload (i.e., damage caused by the attack.) Unfortunately, if the attack is aware of the honey pot, the honey pot can easily be avoided by simply not attacking the honey pot's IP address. Further, some attacks include scans for computers and open ports. A honey pot's existence and vulnerability to such a scanning attack may be lost in a list of other potential targets. As such, the honey pot may not be attacked, but rather other computers containing valuable data.

SUMMARY OF THE INVENTION

Systems and methods for malware attack prevention are provided. According to one method, network data is copied from a communication network. It is then determined if a possible malware attack is within the copied network data. The network data is intercepted based on the determination. The network data is then analyzed to identify a malware attack.

Intercepting the network data based on the determination can comprise identifying a source internet protocol address of the copied network data and intercepting the network data from the communication network transmitted from the source internet protocol address. Intercepting the network data based on the determination can also comprise identifying a target internet protocol address of the copied network data and intercepting the network data from the communication network transmitted to the target internet protocol address.

Analyzing the network data can comprise configuring a virtual machine to receive the network data and analyzing the response of the virtual machine to the network data to identify a malware attack. The method may further comprise generating an unauthorized activity signature based on the identification. Further, the method may also comprise storing the unauthorized activity signature and sending the unauthorized activity signature to another digital device.

Determining if a possible malware attack is within the copied network data can comprise analyzing the copied network data with a heuristic. Determining if a possible malware attack is within the copied network data can also comprise retrieving a virtual machine configured to receive the copied network data, configuring a replayer to transmit the copied network data to the virtual machine, and analyzing a response by the virtual machine to the copied network data to determine if the possible malware attack is within the copied network data. The copied network data may be transmitted between the replayer and the virtual machine over a virtual switch.

A malware attack prevention system can comprise a tap, a heuristic module, an interception module, and an analysis environment. The tap may be configured to copy network data from a communication network. The heuristic module may be configured to receive the copied network data from the tap and determine if a possible malware attack is within the copied network data. The interception module may be configured to intercept the network data based on the heuristic module determination. The analysis environment may be configured to analyze the network data to identify a malware attack.

A machine readable medium may have embodied thereon executable code, the executable code being executable by a processor for performing a method for malware prevention, the method comprising copying network data from a communication network, determining if a possible malware attack is within the copied network data, intercepting the network data based on the determination, and analyzing the network data to identify a malware attack.

DESCRIPTION OF EXEMPLARY EMBODIMENTS

Exemplary systems and methods for malware attack prevention are provided. A malware attack prevention system may include a dynamic honey pot. A dynamic honey pot can monitor network traffic to identify a malware attack. If a malware attack or a probable malware attack is identified, then the network data may be intercepted by the dynamic honey pot. The dynamic honey pot does not have to be directly attacked. Rather, the dynamic honey pot can detect possible malware attacks on other devices on the network and then intercept future network data to analyze the attack.

In exemplary embodiments, network data from a network may be copied and analyzed. If a malware attack or a possible malware attack is detected, related network data may be intercepted. The intercepted network data may continue to be analyzed. If the intercepted network data comprises a network attack, an unauthorized activity signature configured to identify the attack and/or attacker may be generated.

Malware is software created and distributed for malicious purposes and can take the form of viruses, worms, trojan horses or adware, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm might duplicate itself in a computer so many times that it causes the computer to crash. A trojan horse is a destructive program disguised as a game, utility, or application. When run by a user or computer program, a trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and are similarly unaware of the adware and/or spyware's function.

Figure 1:
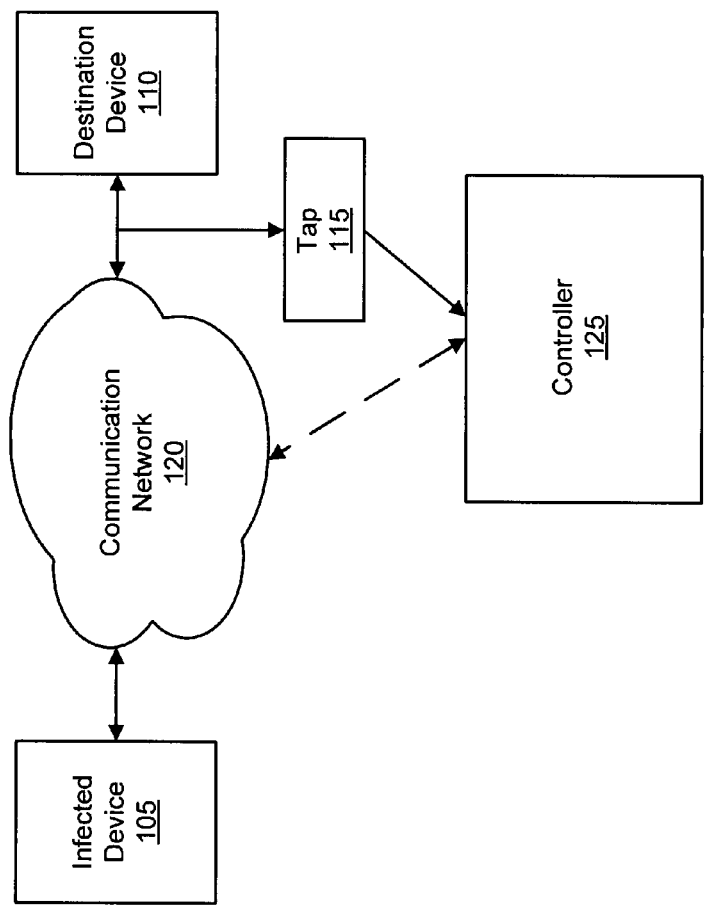
FIG. 1 is a diagram of a malware attack prevention environment in which embodiments of the present invention may be practiced.

FIG. 1 is a diagram of a malware attack prevention environment 100 in which embodiments of the present invention may be practiced. The malware prevention environment 100 comprises an infected device 105, a destination device 110, and a tap 115 each coupled to a communication network 120. The tap 115 is further coupled to a controller 125. Optionally, a router (not shown) may be provided for re-routing data from the communication network 120.

The infected device 105 and the destination device 110 are digital devices. Some examples of digital devices include computers, servers, laptops, personal digital assistants, and cellular telephones. The infected device 105 is configured to transmit network data over the communication network 120 to the destination device 110. The destination device is configured to receive the network data from the infected device 105. The infected device 105 may transmit malware or a malware attack to the destination device 110 via the communication network 120. The malware or malware attack may be transmitted unknowingly, such as when the infected device 105, itself, is infected with the malware or the malware attack may be transmitted knowingly, such as when a hacker utilizes the infected device 105 to perpetuate malware over the communication network 120.

The tap 115 is a digital data tap configured to monitor network data and provide a copy of the network data to the controller 125. In some embodiments, the tap 115 comprises a span port. The network data comprises signals and data that are transmitted over the communication network 120 including data flows from the infected device 105 to the destination device 110. As discussed herein, the network data may include malware and/or a malware attack transmitted from the infected device 105. In one example, the tap 115 copies the network data without an appreciable decline in performance of the infected device 105, the destination device 110, or the communication network 120. The tap 115 can copy any portion of the network data. For example, the tap 115 can receive and copy any number of data packets from the network data.

In some embodiments, the network data can be organized into one or more data flows and provided to the controller 125. In various embodiments, the tap 115 can sample the network data based on a sampling scheme. Data flows can then be reconstructed based on the network data samples.

The tap 115 can also capture metadata from the network data. The metadata can be associated with the infected device 105 and the destination device 110. The metadata can identify the infected device 105 and/or the destination device 110. In some embodiments, the infected device 105 transmits metadata, which is captured by the tap 115. In other embodiments, a heuristic module (described in association with FIG. 2) can determine the infected device 105 and the destination device 110 by analyzing data packets within the network data in order to generate the metadata.

The communication network 120 may comprise a public computer network such as the Internet, a private computer network such as a wireless telecommunication network, wide area network, or local area network.

Although FIG. 1 depicts data transmitted from the infected device 105 to the destination device 110, either device can transmit and receive data from the other. Similarly, although only two devices are depicted, any number of devices can send and/or receive data across the communication network 120. The tap 115 can monitor and copy data transmitted from multiple devices without appreciably effecting the performance of the communication network 120 or the devices coupled to the communication network 120.

The controller 125 includes any digital device or software configured to receive and analyze network data for the presence of malware. In exemplary embodiments, the controller 125 receives network data over the tap 115. If the controller 125 detects a malware attack in the network data, the controller 125 intercepts the associated network data. The associated network data can be network data from the same data flow as that which a malware attack was detected. Further, the associated network data can be network data sent from the same IP address as the device which sent the detected malware attack. The associated network data can also be network data sent to the same IP address as that device which was to receive the detected malware attack. When network data is intercepted, the network data is no longer received by the intended recipient but rather is received by the controller 125. In some embodiments, the associated network data is intercepted when network data is flagged as suspicious. The controller 125 is further discussed in FIG. 2.

Figure 2:
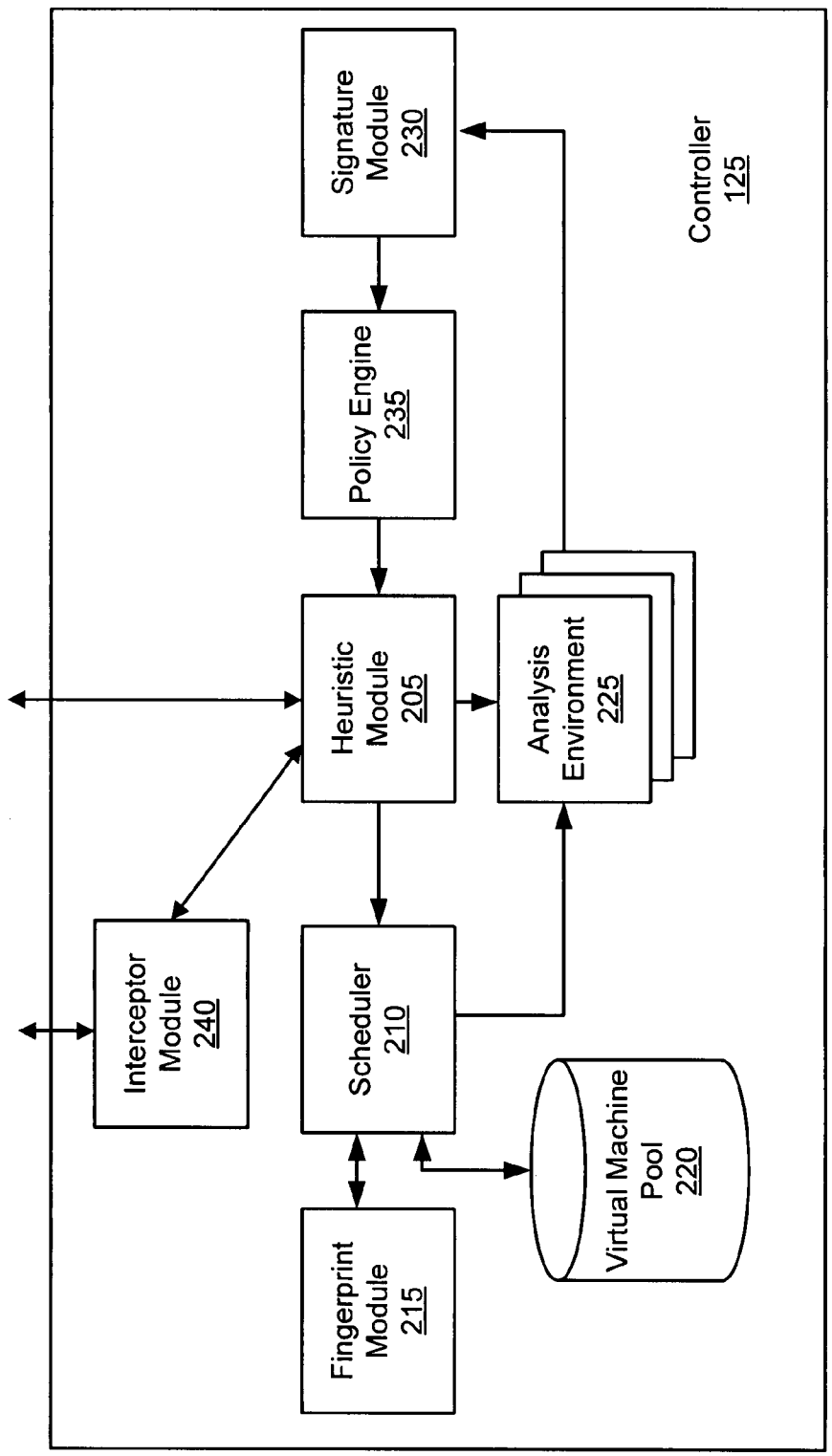
FIG. 2 is a block diagram of an exemplary controller implementing embodiments of the present invention.

FIG. 2 is a block diagram of an exemplary controller 125 implementing embodiments. The controller 125 can be any digital device or software that receives network data. The controller 125 can comprise a heuristic module 205 discussed herein, a scheduler 210, a fingerprint module 215, a virtual machine pool 220, an analysis environment 225, a signature module 230, a policy engine 235, and an interceptor module 240. In some embodiments, the controller 125 comprises a tap which is further coupled to the communication network 120 (FIG. 1). In other embodiments, the controller 125 is coupled to an external tap or may be directly coupled to the communication network 120.

The interceptor module 240 may also be optionally coupled to the communication network 120 over a link. In some embodiments, network data directed to an IP address of the controller 125 is received over the link. The controller 125 can receive network data over the link and the tap in parallel (e.g., simultaneously.)

The heuristic module 205 receives the copy of the network data from the communication network 120 (FIG. 1). The heuristic module 205 applies heuristics and/or probability analysis to determine if the network data might contain suspicious activity. In one example, the heuristic module 205 flags network data as suspicious. The network data can then be buffered and organized into a data flow. The data flow is then provided to the scheduler 210. In some embodiments, the network data is provided directly to the scheduler 210 without buffering or organizing the data flow.

The heuristic module 205 can perform any heuristic and/or probability analysis. In one example, the heuristic module 205 performs a dark internet protocol (IP) heuristic. A dark IP heuristic can flag network data coming from a infected device 105 that has not previously been identified by the heuristic module 205. The dark IP heuristic can also flag network data going to an unassigned IP address. In an example, an attacker scans random IP addresses of a network to identify an active server or workstation. The dark IP heuristic can flag network data directed to an unassigned IP address.

The heuristic module 205 can also perform a dark port heuristic. A dark port heuristic can flag network data transmitted to an unassigned or unusual port address. Such network data transmitted to an unusual port can be indicative of a port scan by a worm or hacker. Further, the heuristic module 205 can flag network data from the infected device 105 (FIG. 1) that is significantly different than traditional data traffic transmitted by the infected device 105. For example, the heuristic module 205 can flag network data from a infected device 105 such as a laptop that begins to transmit network data that is common to a server.

The heuristic module 205 can retain data packets belonging to a particular data flow previously copied by the tap 115. In one example, the heuristic module 205 receives data packets from the tap 115 and stores the data packets within a buffer or other memory. Once the heuristic module 205 receives a predetermined number of data packets from a particular data flow, the heuristic module 205 performs the heuristics and/or probability analysis.

In some embodiments, the heuristic module 205 performs heuristic and/or probability analysis on a set of data packets belonging to a data flow and then stores the data packets within a buffer or other memory. The heuristic module 205 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 205. The buffer can buffer and organize the flagged network data into one or more data flows before providing the one or more data flows to the scheduler 210. In various embodiments, the buffer can buffer network data and stall before providing the network data to the scheduler 210. In one example, the buffer stalls the network data to allow other components of the controller 125 time to complete functions or otherwise clear data congestion.

The scheduler 210 is a module that identifies the destination device 110 and retrieves a virtual machine associated with the destination device 110. A virtual machine may be software that is configured to mimic the performance of a device (e.g., the destination device 110). The virtual machine can be retrieved from the virtual machine pool 220.

In some embodiments, the heuristic module 205 transmits the metadata identifying the destination device 110 to the scheduler 210. In other embodiments, the scheduler 210 receives one or more data packets of the network data from the heuristic module 205 and analyzes the one or more data packets to identify the destination device 110. In yet other embodiments, the metadata can be received from the tap 115.

The scheduler 210 can retrieve and configure the virtual machine to mimic pertinent performance characteristics of the destination device 110. In one example, the scheduler 210 configures characteristics of the virtual machine to mimic only those features of the destination device 110 that are affected by the network data copied by the tap 115. The scheduler 210 can determine the features of the destination device 110 that are affected by the network data by receiving and analyzing the network data from the tap 115. Such features of the destination device 110 can include ports that are to receive the network data, select device drivers that are to respond to the network data and any other devices coupled to or contained within the destination device 110 that can respond to the network data. In other embodiments, the heuristic module 205 can determine the features of the destination device 110 that are affected by the network data by receiving and analyzing the network data from the tap 115. The heuristic module 205 can then transmit the features of the destination device to the scheduler 210.

The optional fingerprint module 215 is configured to determine the packet format of the network data to assist the scheduler 210 in the retrieval and/or configuration of the virtual machine. In one example, the fingerprint module 215 determines that the network data is based on a transmission control protocol/internet protocol (TCP/IP). Thereafter, the scheduler 210 will configure a virtual machine with the appropriate ports to receive TCP/IP packets. In another example, the fingerprint module 215 can configure a virtual machine with appropriate ports to receive user datagram protocol/internet protocol (UDP/IP) packets. The fingerprint module 215 can determine any type of packet format of the network data.

In other embodiments, the optional fingerprint module 215 passively determines a software profile of the network data to assist the scheduler 210 in the retrieval and/or configuration of the virtual machine. The software profile may comprise the operating system (e.g., Linux RH6.2) of the infected device 105 that generated the network data. The determination can be based on analysis of the protocol information of the network data. In an example, the optional fingerprint module 215 determines that the software profile of network data is Windows XP, SP1. The optional fingerprint module 215 can then configure a virtual machine with the appropriate ports and capabilities to receive the network data based on the software profile. In other examples, the optional fingerprint module 215 passes the software profile of the network data to the scheduler 210 and the scheduler 210 either selects or configures the virtual machine based on the profile.

The virtual machine pool 220 is configured to store virtual machines. The virtual machine pool 220 may include any storage capable of storing virtual machines. In one example, the virtual machine pool 220 stores a single virtual machine that can be configured by the scheduler 210 to mimic the performance of any destination device, such as the destination device 110 discussed in FIG. 1, on the communication network 120. The virtual machine pool 220 can store any number of distinct virtual machines that can be configured to simulate the performance of any of the destination devices 110.

The analysis environment 225 is a module that simulates transmission of the network data between the infected device 105 and the destination device 110 to analyze the effects of the network data upon the destination device 110. The analysis environment 225 can identify the effects of malware or illegitimate computer users (e.g., a hacker, computer cracker, or other computer user) by analyzing the simulation of the effects of the network data upon the destination device 110 that is carried out on the virtual machine. There can be multiple analysis environments 225 to simulate multiple network data.

The analysis environment 225 simulates transmission of the network data between the infected device 105 (FIG. 1) and the destination device 110 to analyze the effects of the network data upon the destination device 110 to detect unauthorized activity. As the analysis environment 225 simulates the transmission of the network data, behavior of the virtual machine can be closely monitored for unauthorized activity. If the virtual machine crashes, performs illegal operations, performs abnormally, or allows access of data to an unauthorized computer user, the analysis environment 225 can react. In some embodiments, the analysis environment 225 performs dynamic taint analysis to identify unauthorized activity.

Once unauthorized activity is detected, the analysis environment 225 can generate the unauthorized activity signature configured to identify network data containing unauthorized activity. Since the unauthorized activity signature does not necessarily require probabilistic analysis to detect unauthorized activity within network data, unauthorized activity detection based on the unauthorized activity signature may be very fast and save computing time.

In various embodiments, the unauthorized activity signature may provide code that may be used to eliminate or "patch" portions of network data containing an attack. Further, in some embodiments, the unauthorized activity signature may be used to identify and eliminate (i.e., delete) the malware causing the attack. The unauthorized activity signature may also be used to configure digital devices to eliminate vulnerabilities (e.g., correct system settings such as disabling active-x controls in a browser or updating an operating system.)

The analysis environment 225 may store the unauthorized activity signature within the signature module 230. The analysis environment 225 may also transmit or command the transmission of the unauthorized activity signature to one or more other controllers 125, infected devices 105, destination devices 110, switches, and/or servers. By automatically storing and transmitting the unauthorized activity signature, known malware, previously unidentified malware, and the activities of illicit computer users can be quickly controlled and reduced before a computer system is damaged or compromised. The analysis environment 225 is further discussed with respect to FIG. 3.

The signature module 230 receives, authenticates, and stores unauthorized activity signatures. The unauthorized activity signatures may be generated by the analysis environment 225 or another controller 125. The unauthorized activity signatures may then be transmitted to the signature module 230 of one or more controllers 125.

The policy engine 235 coupled to the heuristic module 205 and is a module that can identify network data as suspicious based upon policies contained within the policy engine 235. In one example, the destination device 110 can be a computer designed to attract hackers and/or worms (e.g., a "honey pot"). The policy engine 235 can contain a policy to flag any network data directed to the "honey pot" as suspicious since the "honey pot" should not be receiving any legitimate network data. In another example, the policy engine 235 cart contain a policy to flag network data directed to any destination device 110 that contains highly sensitive or "mission critical" information.

The policy engine 235 can also dynamically apply a rule to copy all network data related to network data already flagged by the heuristic module 205. In one example, the heuristic module 205 flags a single packet of network data as suspicious. The policy engine 235 then applies a rule to flag all data related to the single packet (e.g., data flows) as suspicious. In some embodiments, the policy engine 235 flags network data related to suspicious network data until the analysis environment 225 determines that the network data flagged as suspicious is related to unauthorized activity.

The policy engine 235 may scan network data to detect unauthorized activity based upon an unauthorized activity signature. In some embodiments, the policy engine 235 retrieves the unauthorized activity signature from the signature module 230. The network data is then scanned for unauthorized activity based on the unauthorized activity signature.

The policy engine 235 can scan the header of a packet of network data as well as the packet contents for unauthorized activity. In some embodiments, the policy engine 235 scans only the header of the packet for unauthorized activity based on the unauthorized activity signature. If unauthorized activity is found, then no further scanning may be performed. In other embodiments, the policy engine 235 scans the packet contents for unauthorized activity.

Unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 235, the heuristic module 205, or the signature module 230 may take action. In one example, the policy engine 235 may generate a rule or command the interceptor module 240 to intercept network data from the infected device 105 and delete or bar the packet from the communication network 120. The policy engine 235 and/or the interceptor module 240 may also quarantine, delete, or bar other packets belonging to the same data flow as the unauthorized activity packet.

Based on a determination that the network data is suspicious, the interceptor module 240 can re-route the associated network data to a virtual machine from the virtual machine pool 220. As discussed herein, the heuristic module 205 can provide information that the network data is suspicious. The interceptor module 240 can intercept all of the network data that is initially flagged by the heuristic module 205. In interceptor module can also base the interception of data on the detection of a malware attack by the analysis environment 225 or a policy or signature by the policy engine 235.

The interceptor module 240 can provide the intercepted data to the heuristic module 205 for analysis with a heuristic or to the analysis environment 225 to orchestrate the transmission of the intercepted data to detect a malware attack. If no malware attack is detected, the interceptor module 240 can transmit some or all of the intercepted data to the intended recipient (e.g., destination device 110.) If a malware attack is detected within the intercepted data, the unauthorized activity signature may be generated by the signature module 230 and transmitted to one or more controllers 125 or other digital devices.

The interceptor module 240 can redirect network data from the infected device 105 in any number of ways including, but not limited to, configuring a switch, Address Resolution Protocol (ARP) manipulation, or DHCP services.

The interceptor module 240 may send a request to a switch to redirect network data from any infected device 105 to the controller 125. The switch includes any device configured to receive and direct network data between one or more digital devices. Examples of a switch include, but is not limited to, a router, gateway, bridge, and, or server.

In some embodiments, executable code is loaded onto the switch. In one example, the executable code configures the switch to direct network data from any infected device 105 to the controller 125. In another example, the executable code allows the interceptor module 240 to transmit a request to the switch to direct network data from the infected device 105 to the controller 125. In some embodiments, the interceptor module 240 configures the router to intercept network data from the infected device 105 for a predetermined time. The predetermined time may be set by the interceptor module 240, preloaded into the switch, or configured by a user.

The interceptor module 240 may manipulate dynamic host configuration protocol (DHCP) services to intercept network data. As the infected device 105 transmits network data that is flagged as suspicious or otherwise identified as containing a malware attack. The interceptor module 240 may manipulate DHCP services to assign new IP addresses, associate the controller 125 MAC address with the IP address of the destination device 110, or otherwise redirect network data from the infected device 105 to the controller 125.

In various embodiments, the interceptor module 240 can manipulate the DHCP server to configure the infected device 105 with a gateway IP address which is the same as the controller's 125 IP address to send all network data to the controller 125. In other embodiments, the interceptor module 240 may perform DHCP services for the communication network 120 as a DHCP server.

In one example of ARP manipulation, the heuristic module 205 or the interceptor module 240 scans the copied network data flagged as suspicious to identify a source IP address and a target IP address. The source IP address is the IP address of the infected device 105. The target IP address is the IP address of the destination device 110. In some embodiments, the interceptor module 240 may send an ARP reply to the infected device 105. The ARP reply is configured to identify the MAC address of the controller 125 with the IP address of the destination device 110. When the infected device 105 receives the ARP reply, the infected device 105 may begin to send network data intended for the destination device to the controller 125.

In other embodiments, a policy within the policy engine may indicate which IP addresses are infected devices 105. Whenever an infected device 105 first sends network data to a destination device 110 that it has not sent network data to in the past, the infected device 105 may transmit an ARP request. The network data identifying the source IP address is copied by the tap 115 and the policy within the policy engine 235 can flag the source IP address as an infected device 105. Thereafter, the interceptor module 240 may store the ARP request, and provide the controller 125 MAC address in an ARP reply to the switch and/or the infected device 105. Once the switch and/or the infected device 105 receives the controller 125 MAC address in the ARP reply, the IP address of the digital device (e.g., destination device 110) will be associated with the controller 125 MAC address (e.g., in memory storage or cache). Network data intended for the destination device 110 may then be transmit from the infected device 105 to the controller 125.

The infected device 105 may send the network data to any number of digital devices. Before the attack can proceed, the infected device 105 may send a separate ARP request for the IP address of every other digital device the malware wishes to send data to. The controller 125 detects and responds to each ARP request by sending an ARP reply to each request with the controller 125 MAC address. The controller 125 MAC address may be associated with the IP address of the other digital devices on a table within the infected device 105, switch, and/or server (not depicted). The table may be within memory, storage, buffered, and/or cached. As a result, network data transmitted by the infected device 105 to multiple destination devices 110 may be intercepted by the controller 125.

Once the network data is intercepted, the network data is re-routed to the virtual machine, as discussed herein. Because the network data is re-routed, the actual machine or the destination device 110 for which the network data is intended may not receive the network data and is, as a result, unaffected. A plurality of the network data can be re-routed to more than one virtual machine at one time (e.g., in parallel.) Thus, if the network data intended for a plurality of the destination devices 110 is flagged as suspicious, or as coming from the infected device 105 that has previously been deemed suspicious, the interceptor module 240 can select a plurality of virtual machines on which to test the suspicious network data.

The policy engine 235 is coupled to the heuristic module 205 and can identify network data as unauthorized activity. The policy engine 235 may scan network data to detect unauthorized activity based upon an unauthorized activity signature. In some embodiments, the policy engine 235 retrieves the unauthorized activity signature from the signature module 230 (discussed herein). The network data is then scanned for unauthorized activity based on the unauthorized activity signature. The policy engine 235 can also flag network data as suspicious based on policies, as discussed herein.

The policy engine 235 can scan the header of a packet of network data as well as the packet contents for unauthorized activity. In some embodiments, the policy engine 235 scans only the header of the packet for unauthorized activity based on the unauthorized activity signature. If unauthorized activity is found, then no further scanning may be performed. In other embodiments, the policy engine 235 scans the packet contents for unauthorized activity. As discussed herein, in response to the identification of the unauthorized, activity, the interceptor module 240 can re-route the network data that is the source of the unauthorized activity to the virtual machine to test the unauthorized activity utilizing the virtual machine as a dynamic honey pot.

Unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 235, the heuristic module 205, or the signature module 230 may take action. In one example, the policy engine 235 may quarantine, delete, or bar the packet from the communications network. The policy engine 235 may also quarantine, delete, or bar other packets belonging to the same data flow as the unauthorized activity packet. Accordingly, the interceptor module 240 can then implement the quarantine, deletion, or barring of the packets by re-routing the packets away from the destination device 110 for which the packets are intended. Any type of action may be implemented by the interceptor module 240.

The signature module 230 receives, authenticates, and stores unauthorized activity signatures. The unauthorized activity signatures may be generated by the analysis environment 225 or another controller. The unauthorized activity signatures may then be transmitted to the signature module 230 of one or more controllers, such as the controller 125 discussed herein.

Although FIG. 2 depicts various modules comprising the controller 125, fewer or more modules can comprise the controller 125 and still fall within the scope of various embodiments.

Figure 3:
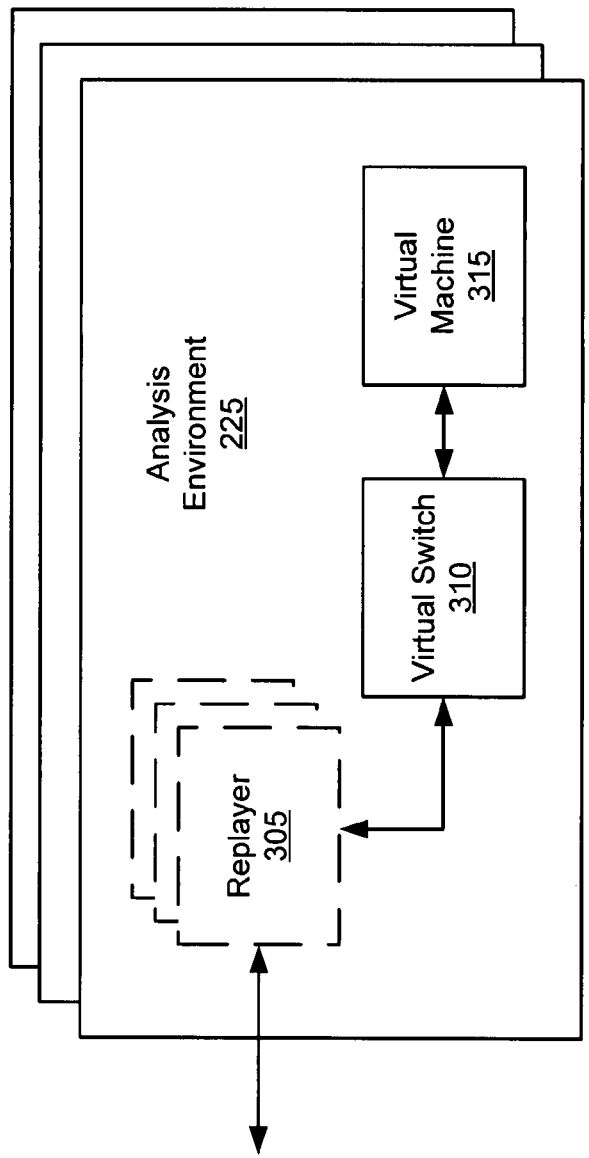
FIG. 3 is a block diagram of an exemplary analysis environment.

FIG. 3 depicts an analysis environment 225, in accordance with one embodiment of the present invention. The analysis environment 225 comprises a replayer 305, a virtual switch 310, and a virtual machine 315. The replayer 305 is a module that receives network data that has been flagged by the heuristic module 205 and replays the network data in the analysis environment 225. In some embodiments, the replayer 305 mimics the behavior of the infected device 105 in transmitting the flagged network data. There can be any number of replayers 305 simulating the transmission of network data between the infected device 105 and the destination device 110. In a further embodiment, the replayer dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session. In other embodiments, the network data received from the heuristic module 205 is transmitted to the virtual machine 315 without a replayer 305.

In various embodiments, the controller 125 does not comprise a heuristic module 205 and the analysis environment 225 does not comprise a replayer 305. In one example, the copy of the network data received from the tap is received by the analysis environment which analyzes the response of the virtual machine to the copy of the network data to identify the malware attack.

The virtual switch 310 is a module that is capable of forwarding packets of flagged network data to the virtual machine 315. In one example, the replayer 305 simulates the transmission of the data flow by the infected device 105. The virtual switch 310 simulates the communication network 120 and the virtual machine 315 simulates the destination device 110. The virtual switch 310 can route the data packets of the data flow to the correct ports of the virtual machine 315.

The virtual machine 315 is a representation of the destination device 110 that can be provided to the analysis environment 225 by the scheduler 210. In one example, the scheduler 210 retrieves a virtual machine 315 from the virtual machine pool 220 and configures the virtual machine 315 to mimic the infected device 105. The configured virtual machine 315 is then provided to the analysis environment 225 where it can receive flagged network data from the virtual switch 310.

As the analysis environment 225 simulates the transmission of the network data, behavior of the virtual machine 315 can be closely monitored for unauthorized activity. If the virtual machine 315 crashes, performs illegal operations, performs abnormally, or allows access of data to an unauthorized computer user, the analysis environment 225 can react.

In some embodiments, the analysis environment 225 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 225 monitors and analyzes the behavior of the virtual machine 315 in order to determine a specific type of malware or the presence of an illicit computer user. The analysis environment 225 can also generate computer code configured to eliminate new viruses, worms, or other malware. In various embodiments, the analysis environment 225 can generate computer code configured to identify data within the network data indicative of a malware attack, repair damage performed by malware, or the illicit computer user. By simulating the transmission of suspicious network data and analyzing the response of the virtual machine, the analysis environment 225 can identify known and previously unidentified malware and the activities of illicit computer users before a computer system is damaged or compromised.

Figure 4:
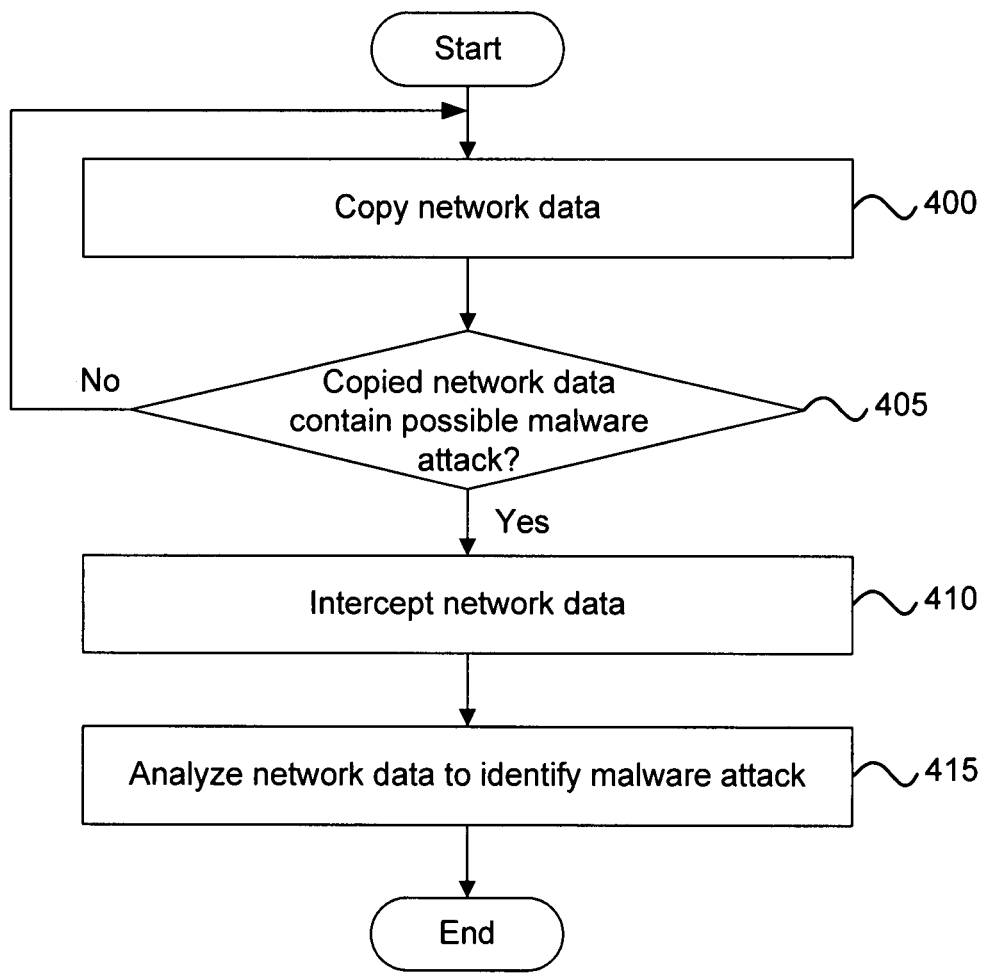
FIG. 4 is a flowchart of an exemplary method for malware attack prevention.

FIG. 4 is a flowchart of an exemplary method for malware attack prevention. At step 400, the network data is copied. As discussed herein, the network data from the infected device 105 may be copied by the tap 115. The network data is then sent from the tap 115 to the controller 125.

At step 405, it is determined whether the copied network data contains a possible malware attack. As discussed herein, the controller 125 utilizes various modules, such as the heuristic module 205 and the analysis environment 225 to determine whether the copied network data contains the possible malware attack or may otherwise be potentially harmful to the destination device 110 for which the copied network data is intended. The heuristic module 205 can flag the copied network data as suspicious. If the controller 125 does not identify the copied network data as possibly containing the malware attack, the network data continues to be transmitted to the destination device 110. New network data may then be copied in step 400.

In other embodiments, the policy engine 235 determines if the copy of the network data is suspicious. In one example, the policy engine 235 comprises a list of nonfunctional "dark" internet protocol (IP) addresses. A dark IP address is an unassigned IP address or an IP address that is not associated with the communication network 120. The policy engine 235 can determine the target IP address of the copy of the network data (e.g., by scanning the header within the network data). If the network data is transmitted to a dark IP address, the policy engine 235 can scan the network data to determine the IP address of the source of the network data and then generate a policy to watch network data from the source IP address.

If more network data is transmitted from the previously identified source IP address to one or more dark IP addresses, the policy engine 235 can flag the network data as suspicious and possibly contain a malware attack in step 405.

Any module of the controller 125 can also determine if the target IP address of the copy of the network data is directed towards a dark IP address. In one example, the heuristic module 205 retrieves the list of dark IP addresses from the policy engine 235 and determines if the copy of the network data is directed towards a dark IP address. In another example, the policy engine 235 comprises a list of active IP addresses and assumes (or the heuristic module 205 assumes) that any network data directed to an unidentified IP address is a dark IP address.

At step 410, the network data is intercepted. In some embodiments, network data is flagged as suspicious by the heuristic module 205. The interceptor module 240 may then intercept associated network data from the source IP address or receive network data transmitted to the destination device 110. In other embodiments, the network data is flagged as suspicious by the heuristic module 205 and then the transmission of the flagged network data is then orchestrated to a virtual machine to detect a malware attack in the analysis environment 225. If a malware attack is detected by the analysis environment 225, the interceptor module 240 may be directed to intercept the associated network data.

In some embodiments, the interceptor module 240 can notify a DHCP server to associate a given dark IP addresses (e.g., an unassigned IP address) to the controller 125. In one example, the DHCP server may comprise a list of unassigned IP addresses that may be assigned to the controller 125 as needed. The interceptor module 240 can assign the previously unassigned IP address to the controller 125.

In other embodiments, the interceptor module 240 can perform ARP manipulation or a proxy ARP to intercept network data. In one example, the interceptor module 240 can request that a router or DNS server forward network data to the controller 125 rather than the original destination device.

At step 415, the intercepted network data is analyzed to identify a malware attack within the network data. As discussed herein, the interceptor module 240 can intercept associated network data based on the determination that the copied network data is potentially dangerous to the destination device 110. Once the interceptor module 240 intercepts the network data that correlates with the copied network data, the network data can be forwarded to the analysis environment 225. The analysis environment 225 can test the intercepted network data by examining the response of the virtual machine to the intercepted network data.

If the test reveals that the network data is harmful or otherwise contains malware, the interceptor device 240 can quarantine the network data, delete the network data, and so forth. The interceptor device 240, or any other module associated with the controller 125, may send a notice to the destination device 110 informing the destination device 110 that corrupted data from the infected device 105 was sent to the destination device 110, according to some embodiments.

The interceptor device 240 can also clean the network data and send an uncorrupted version of the network data to the destination device. The interceptor device 240 can continue to intercept the network data from the infected device 105 that sent the network data containing the malware attack for a period of time, until a notice is received from the infected device 105 that the infected device 105 is no longer infected, until the interceptor device 240 determines that the network data from the infected device 105 is safe, and so on. Any type of determination of when to stop interception of the network data from the infected device 105 may be employed. According to some embodiments, the tap 115 implements a brief delay in the transmission of the network data being copied so the interceptor device 240 can intercept the network data determined by the controller 125 to be potentially harmful.

Figure 5:
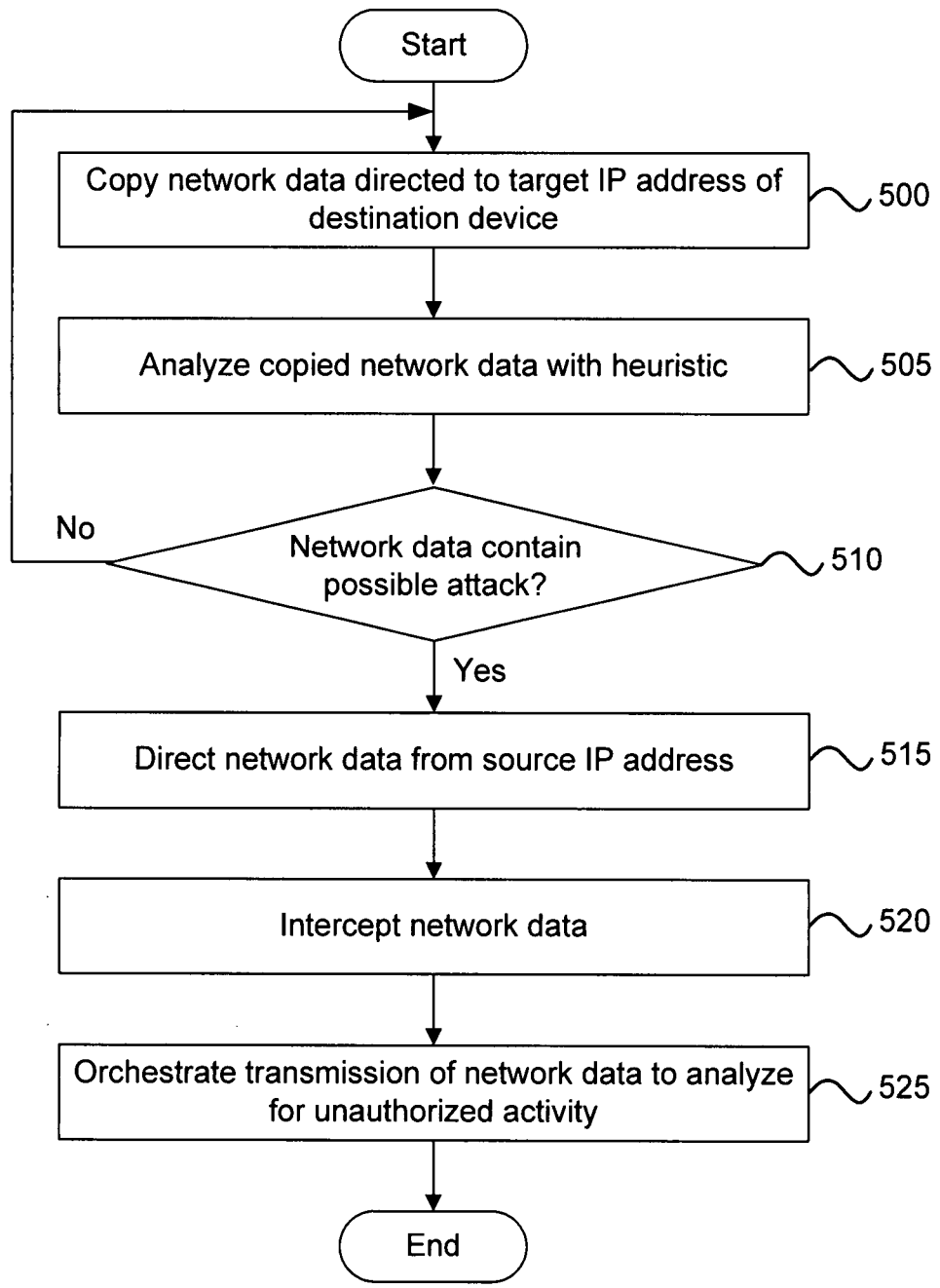
FIG. 5 is another flowchart of an exemplary method for malware attack prevention.

FIG. 5 is another flowchart of an exemplary method for malware attack prevention. At step 500, network data directed to a target IP address associated with the destination device 110 is copied. As discussed herein, the tap 115 or span port can copy the network data being transmitted via the communication network 120. The tap 115 can, according to some embodiments, copy only the network data intended for a particular set of IP addresses associated with a particular set of the destination devices 110. The copied network data is then analyzed based on a heuristic model associated with the heuristic module 205, at step 505.

Based on the heuristic model applied to the copied network data, a determination as to whether the network data contains a possible attack or corrupted data can be made at step 510. The determination may be made based on the heuristic model only or based on further analysis, as discussed herein. If the network data is not identified as possibly containing the attack, the network data continues to be transmitted to the IP address of the destination device 110.

However, if the network data is identified as possibly containing the attack, the network data is directed away from the destination device 110 (i.e., the target IP address). For example, as discussed herein, a router (not shown) may be configured to reroute network data from the infected device 105 to the controller 125. New network data may then be copied in step 500.

In various embodiments, network data from the infected device 105 is copied by the tap 115 and then received by the controller 125. If the controller 125 flags the network data as suspicious, the router (i.e., switch) may be configured to direct all data received from the infected device 105 (e.g., from the source IP address of the infected device 105) to the controller 125. As a result, all the network data from the infected device 105, and not only that which is transmitted to the destination device 110 may be intercepted.

At step 525, transmission of the network data is orchestrated to analyze the network data for unauthorized activity. As discussed herein, the virtual machine 315 that emulates or most closely emulates the destination device 110 for which the network data is intended is selected. The analysis environment 225 utilizes the intercepted network data to test the network data on the virtual machine 315. If the network data does not cause unauthorized activity on the virtual machine 315, the network data may be transmitted to the destination device 110. The signature module 230 can also assign a signature to the network data. If the network data does cause unauthorized activity on the virtual machine 315, the network data can be quarantined, deleted, cleaned, and so forth. The signature module 230 can assign a signature to the network data and the policy engine 235 can identify the IP address from the infected device 105 providing the network data as an infected, or otherwise potentially harmful, source.

In other embodiments, the controller 125 does not comprise a heuristic module 205. The analysis environment 225 can orchestrate the transmission of the network data by transmitting the copy of the network data to a virtual machine 315. The analysis environment 225 can then monitor the reaction of the virtual machine 315 to the copy of the network data to identify a malware attack. Upon the identification of a malware attack, the analysis environment 225 can direct the interceptor module 240 to intercept the network data going to the destination device 110 and/or transmitted from the infected device 105 associated with the source IP address of the network data containing the malware attack.

Figure 6:
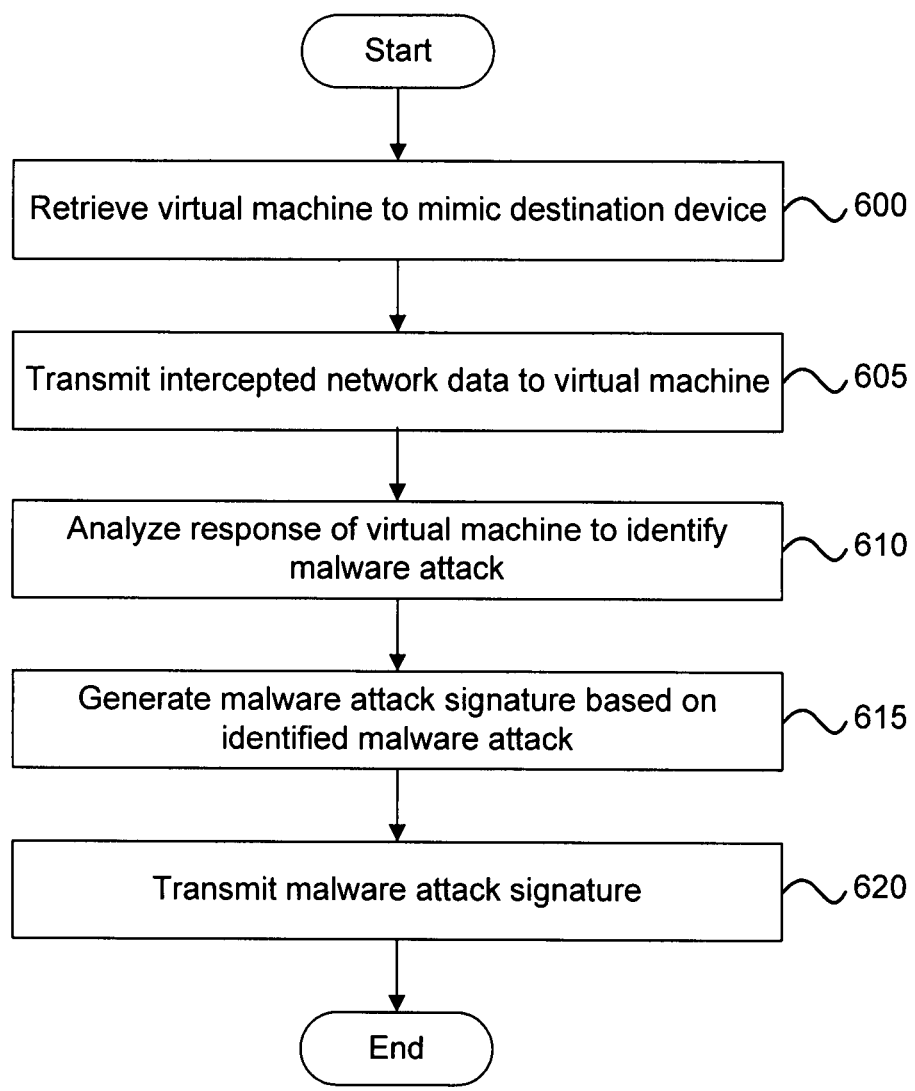
FIG. 6 is a flowchart of an exemplary method for transmitting a malware attack signature.

FIG. 6 is a flowchart of an exemplary method for transmitting a malware attack signature. At step 600, a virtual machine 315 is retrieved to mimic the destination device 110. As discussed herein, the virtual machine 315 is selected from the virtual machine pool 220. The virtual machine 315 is selected based on characteristics of the virtual machine 315 that most closely match characteristics associated with the destination device 110 for which the network data is intended to be transmitted.

At step 605, intercepted network data is transmitted to the virtual machine 315. The interceptor module 240 intercepts potentially harmful network data and transmits the intercepted network data to the virtual machine 315 for testing of the potentially harmful network data. According to alternative embodiments, the interceptor module 240 can intercept all of the network data being transmitted and test all of the network data before routing the network data to the destination device 110 for which the network data is intended.

In step 610, the analysis environment 225 analyzes the response of the virtual machine 315 to the network data to identify a malware attack. In one example, an optional replayer 305 is configured to perform similarly to the infected device 105 and transmit the network data over a virtual switch 310 to the virtual machine 315. In various embodiments, there may be any number of replayers 305 configured to transmit network data to different virtual machines 315 in parallel. Similarly, multiple analysis environments 225 may operate in parallel. The analysis environment 225 analyzes the response of the virtual machine 315 to the network data (e.g., with taint analysis).

If the network data does not contain unauthorized activity, then the method may end. If the network data contains unauthorized activity, then an unauthorized activity signature is generated based on the unauthorized activity in step 615. The unauthorized activity signature may be generated by the analysis environment 225 or the signature module 230.

In step 620, the unauthorized activity signature is transmitted to one or more other controllers 125 or any digital device (e.g., server or infected device 105). The receiving controller 125 can store the unauthorized activity signature within the receiving controller's signature module 230 or policy engine 235. The policy engine 235 may use the unauthorized activity signature to scan network data received by the controller 125 to flag the network data as suspicious or containing unauthorized activity without any further analysis (by either the heuristic module 205 or the analysis environment 225.)

Optionally the unauthorized activity signature may be authenticated. In some embodiments, the analysis environment 225 can generate an authentication code along with the unauthorized activity signature. The authentication code can then be scanned to determine that the unauthorized activity signature is verified. In one example, the analysis environment 225 generates the unauthorized activity signature and an authentication code. The analysis environment 225 transmits the unauthorized activity signature and the authentication code to another controller 125. The controller 125 verifies the authentication code to ensure that the unauthorized activity signature is genuine. If the unauthorized activity signature is authenticated, then the signature module 230 stores the unauthorized activity signature.

The unauthorized activity signature can also be encrypted. In one example, the controller 125 generates, encrypts, and transmits the unauthorized activity signature to another controller 125. The receiving controller 125 can decrypt the unauthorized activity signature and store the unauthorized activity signature within the signature module 230. In some embodiments, the controller 125 generates an authentication code and proceeds to encrypt the authentication code and the unauthorized activity signature prior to transmitting the authentication code and the unauthorized activity signature to another controller 125.

Figure 7:
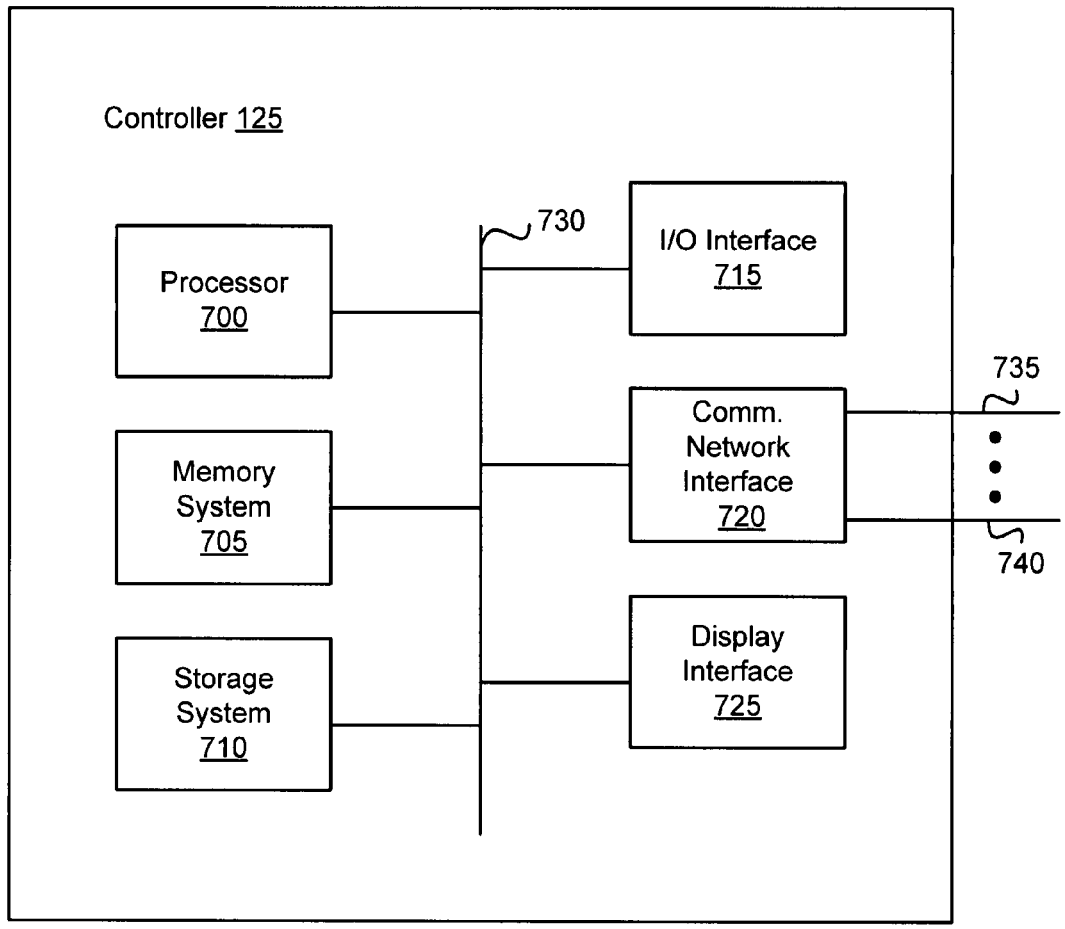
FIG. 7 is a block diagram of an exemplary controller in which embodiments of the present invention may be practiced.

FIG. 7 is a block diagram of the controller 125 (FIG. 1), in accordance with one embodiment of the present invention.

The controller 125 comprises a processor 700, a memory system 705, a storage system 710, an I/O interface 715, a communication network interface 720, and a display interface 725 which are all coupled to a system bus 730. The processor 700 is configured to execute executable instructions. In some embodiments, the processor 700 comprises circuitry or any one or more processors capable of processing the executable instructions.

The memory system 705 is any memory configured to store data. Some examples of the memory system 705 include storage devices, such as RAM or ROM.

The storage system 710 is any storage configured to retrieve and store data. Some examples of the storage system 710 are flash drives, hard drives, optical drives, and/or magnetic tape. The storage system 710 can comprise a database or other data structure configured to hold and organize data (e.g., network data, copies of network data, buffered data.) In some embodiments, the controller 125 includes memory 705 in the form of RAM and storage 710 in the form of flash data. The memory system 705 and/or the storage system 710 can comprise cache and buffers configured to retain network data or copies of network data.

The input/output (I/O) interface 715 is any device that can receive input and provide output to a user. The I/O interface 715 can be, but is not limited to, a keyboard, a mouse, a touchscreen, a keypad, a biosensor, or floppy disk drive.

The communication network interface 720 can be coupled to any user device via the link 735 through link 740. The communication network interface 720 may support communication over a USB connection, a firewire connection, an Ethernet connection, a serial connection, a parallel connection, or an ATA connection. The communication network interface 720 may also support wireless communication (e.g., 802.11 a/b/g/n or wireless USB). It will be apparent to those skilled in the art that the communication network interface 720 can support many wired and wireless standards.

Although only two links (735 and 740) are depicted in FIG. 7, there may be any number of links. In various embodiments, there may be one link 735 used by the tap 115 to transparently copy network data from the communication network 120. The other links may be used by the controller 125 (e.g., through the interceptor module 240) to intercept data from one or more infected devices 105 in parallel. In one example, the controller 125 comprises multiple IP addresses that may be broadcast from different links. Network data may be intercepted from different infected devices 105 by different links.

The display interface 725 is an interface configured to support a display, monitor, or screen. In some embodiments, the controller 125 comprises a graphical user interface to be displayed to a user over a monitor in order to allow the user to control the controller 125.

The above-described modules can be comprised of instructions that are stored on storage media. The instructions can be retrieved and executed by a processor (e.g., the processor 700). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

While various embodiments have been described above, it should be understood that they have been presented by way of example only, and not limitation. For example, any of the elements associated with the interceptor module 240 may employ any of the desired functionality set forth hereinabove.

Thus, the breadth and scope of a preferred embodiment should not be limited by any of the above-described exemplary embodiments.

What is claimed is:

1. A malware attack prevention method comprising:
copying a first network data from a communication network;
configuring a replayer to dynamically modify one or more session variables and simulate behavior of a device responsible for transmission of the first network data on the communication network, the replayer to transmit modified first network data including at least a portion of the copied first network data and the one or more session variables to a virtual machine;
before determining whether the at least the portion of the copied first network data is indicative of a malware attack, transmitting the modified first network data to the virtual machine, the virtual machine being configured to receive the modified first network data and provide a response thereto;
analyzing the response by the virtual machine to the modified first network data to determine whether at least the portion of the copied first network data is indicative of a malware attack; and
intercepting a second network data based on determining that at least the portion of the copied first network data is indicative of a malware attack.

2. The method of claim 1, wherein the intercepting of the second network data comprises:
identifying a source internet protocol address of the portion of the copied first network data; and
intercepting the second network data from the communication network transmitted from the source internet protocol address, the second network data being received by the controller subsequent to the first network data.

3. The method of claim 1, wherein the intercepting of the second network data comprises:
identifying a target internet protocol address of the portion of the copied first network data; and
intercepting the second network data from the communication network transmitted to the target internet protocol address.

4. The method of claim 1, further comprising generating an unauthorized activity signature based on determining that at least the portion of the copied first network data is indicative of a malware attack.

5. The method of claim 4, further comprising:
storing the unauthorized activity signature; and
sending the unauthorized activity signature to another digital device.

6. The method of claim 1, wherein before transmitting the modified first network data to the virtual machine, analyzing the copied first network data by applying heuristics or probability analysis to determine if the copied first network data is suspicious and transmitting only the suspicious, copied first network data as the portion of the copied first network data to the virtual machine.

7. The method of claim 1, wherein the virtual machine providing the response based on processing of the modified first network data within the virtual machines.

8. The method of claim 1, wherein the modified first network data is transmitted between the replayer and the virtual machine over a virtual switch, the virtual switch simulates a communication network.

9. A malware attack prevention system comprising:
a controller including a digital device that is configured to receive a copy of a first network data from a communication network, the controller comprising:
a scheduler to initiate configuration of a virtual machine, the virtual machine configured to, at least in part, correspond in functionality to a destination device targeted to receive the copied first network data; and
an analysis environment configured to simulate transmission of the first network data to determine whether at least a portion of the copied first network data is indicative of a malware attack based on monitored behavior of the virtual machine, the analysis environment comprises
a replayer configured to dynamically modify one or more session variables and simulate behavior of a device responsible for transmission of the first network data on the communication network, the replayer to further transmit modified first network data including at least the portion of the copied first network data and the one or more modified session variables to a virtual machine,
the virtual machine configured to receive the modified first network data before the system determines whether at least the portion of the copied first network data is indicative of a malware attack, the virtual machine being further configured to provide a response to the modified first network data, and
an interception module configured to intercept second network data upon determining that at least the portion of the copied first network data is indicative of a malware attack.

10. The system of claim 9, wherein the interception module is configured to identify a source internet protocol address of the portion of the copied first network data and intercept the second network data from the communication network transmitted from the source internet protocol address, the second network data being received by the controller subsequent to the first network data.

11. The system of claim 9, wherein the interception module is configured to identify a target internet protocol address of the portion of the copied first network data and intercept the second network data from the communication network transmitted from the target internet protocol address.

12. The system of claim 9, wherein the analysis environment comprises an analysis module configured to analyze the response of the virtual machine to determine, based on the behavior of the virtual machine, whether at least the portion of the copied first network data is indicative of a malware attack.

13. The system of claim 9, further comprising a signature module configured to generate an unauthorized activity signature based on determining that at least the portion of the copied first network data is indicative of a malware attack.

14. The system of claim 13, wherein the signature module is further configured to:
store the unauthorized activity signature; and
send the unauthorized activity signature to another digital device different than the controller.

15. The system of claim 9, wherein the controller further comprises a heuristic module configured to analyze the copied first network data with a heuristic.

16. The system of claim 9, wherein the virtual machine to provide the response based on processing the modified first network data within the virtual machine.

17. The system of claim 9, wherein the analysis environment transmits the copied modified network data between the replayer and the virtual machine over a virtual switch.

18. A non-transitory machine readable medium having embodied thereon executable code, the executable code being executable by a processor within a first digital device for performing operations for malware prevention comprising:
receiving first network data from a communication network;
dynamically modifying the first network data by a replayer, the replayer to simulate behavior of a device responsible for transmission of the first network data on the communication network;
transmitting the modified first network data to a virtual machine, the virtual machine being configured to receive the modified first network data and provide a response thereto;
analyzing the response by the virtual machine to the modified first network data to determine whether the modified first network data is indicative of a malware attack; and
intercepting second network data based on determining that the modified first network data is indicative of a malware attack.

19. The non-transitory machine readable medium of claim 18, wherein intercepting the second network data based on the determination comprises:
identifying a source internet protocol address of the modified first network data; and
intercepting the second network data from the communication network that is received subsequent from the modified first network data and transmitted from the source internet protocol address.

20. The non-transitory machine readable medium of claim 18, wherein intercepting of the second network data comprises:
identifying a target internet protocol address of the modified first network data; and
intercepting the second network data from the communication network transmitted to the target internet protocol address, the second network data including network data corresponding to the modified first network data and the second network data received subsequent to the first network data.

21. The non-transitory machine readable medium of claim 18, wherein analyzing of the response comprises analyzing the response of the virtual machine to determine, based on the behavior of the virtual machine, whether the modified first network data is indicative of a malware attack.

22. The non-transitory machine readable medium of claim 21, wherein the method further comprises generating an unauthorized activity signature based on determining that the modified first network data is indicative of a malware attack.

23. The non-transitory machine readable medium of claim 22, wherein the method further comprises:
storing the unauthorized activity signature; and
sending the unauthorized activity signature to a second digital device different than the first digital device.

24. A non-transitory machine readable medium having embodied thereon executable code, the executable code being executable by a processor for performing operations for malware prevention comprising:
receiving network data from a communication network;
dynamically modifying the network data by a replayer, the replayer to simulate behavior of a device responsible for transmission of the network data on the communication network;
transmitting the modified network data to a virtual machine that is configured to, at least in part, correspond in functionality to a device targeted to receive the network data, the virtual machine being configured to receive the modified network data and provide a response thereto while processing the modified network data;

analyzing the response by the virtual machine to the modified network data to determine whether the modified network data is indicative of a malware attack; and intercepting subsequent network data based on determining that the modified network data is indicative of a malware attack.

25. The non-transitory machine readable medium of claim 24, wherein the replayer to operate with the virtual machine to produce the response by the virtual machine that includes results of an analysis of the modified network data by the virtual machine, the replayer being configured to dynamically modify session variables and simulate behavior of the device responsible for transmission of the network data on the communication network to produce the modified network data.

26. The malware attack prevention method of claim 1, wherein the transmitting of the modified first network data to the virtual machine and the analyzing of the response by the virtual machine to the modified first network data is conducted within a private computer network.

27. The malware attack prevention method of claim 1, wherein the replayer is configured to dynamically modify the session variables to emulate a protocol sequence.

28. The malware attack prevention method of claim 27, wherein the session variables include dynamically assigned ports.

29. The malware attack prevention method of claim 27, wherein the session variables include transaction identifiers.

30. The malware attack prevention method of claim 1, wherein the virtual machine is configured based on analysis of a packet format of the copied first network data.

31. The malware attack prevention method of claim 1, wherein the virtual machine is configured based on analysis of a protocol utilized by the copied first network data.

32. The malware attack prevention method of claim 31, wherein the virtual machine is configured by retrieving the virtual machine according to a packet format of the copied first network data or the protocol utilized by the copied first network data from a virtual machine pool.

33. The malware attack prevention method of claim 1, wherein the replayer simulates a transmission of at least the portion of the copied first network data being a data flow including one or more related data packets.

34. The malware attack prevention system of claim 9 further comprising a tap configured to copy the first network data from the communication network, the tap and the controller are positioned within a private computer network.

35. The malware attack prevention system of claim 9, wherein the replayer of the analysis environment is configured to dynamically modify the session variables to emulate a protocol sequence.

36. The malware attack prevention system of claim 35, wherein the session variables include dynamically assigned ports.

37. The malware attack prevention system of claim 35, wherein the session variables include transaction identifiers.

38. The malware attack prevention system of claim 9, wherein the configuration of the virtual machine of the analysis environment is based on an analysis of a packet format of the copied first network data.

39. The malware attack prevention system of claim 9, wherein the configuration of the virtual machine of the analysis environment is based on an analysis of a protocol utilized by the copied first network data.

40. The malware attack prevention system of claim 38, wherein the configuration of the virtual machine of the analysis environment is performed by retrieving the virtual machine from a virtual machine pool according to the packet format of the copied first network data or a protocol utilized by the copied first network data.

41. The malware attack prevention system of claim 9, wherein the analysis environment further comprises a virtual switch communicatively coupled to both the replayer and the virtual machine, the virtual switch simulates a communication network that enables communications between the replayer and one or more ports of the virtual machine.

42. The malware attack prevention system of claim 9, wherein the replayer of the analysis environment simulates a transmission of at least the portion of the first network data being a data flow including one or more related data packets.

43. The non-transitory machine readable medium of claim 24, wherein the processor performs an operation of intercepting the subsequent network data by identifying a source internet protocol address of the network data and intercepting the subsequent network data from the communication network transmitted from the source internet protocol address, the subsequent network data being received by the controller after the network data.

44. The non-transitory machine readable medium of claim 24, wherein the processor performs an operation of intercepting the subsequent network data by identifying a target internet protocol address of the network data and intercepting the subsequent network data from the communication network transmitted to the target internet protocol address.

45. The non-transitory machine readable medium of claim 24, wherein the processor performs an operation that comprises generating an unauthorized activity signature based on the identification.

46. The non-transitory machine readable medium of claim 45, wherein the processor further performs operations comprising:
storing the unauthorized activity signature; and
sending the unauthorized activity signature to another digital device.

47. The non-transitory machine readable medium of claim 24, wherein before transmitting the modified network data to the virtual machine, the network data is analyzed by applying heuristics or probability analysis to determine if the network data is suspicious and transmitting only the suspicious network data to the virtual machine.

48. The non-transitory machine readable medium of claim 24, wherein the replayer and the virtual machine conduct processing within a controller situated within a private computer network, the controller being a digital device configured to receive and analyze the network data to detect the malware attack.

49. The non-transitory machine readable medium of claim 24, wherein the replayer comprises a module executed by the processor that is configured to dynamically modify the session variables to emulate a protocol sequence.

50. The non-transitory machine readable medium of claim 49, wherein the session variables include dynamically assigned ports.

51. The non-transitory machine readable medium of claim 49, wherein the session variables include transaction identifiers.

52. The non-transitory machine readable medium of claim 24, wherein the virtual machine is configured based on analysis of a packet format of the network data.

53. The non-transitory machine readable medium of claim 24, wherein the virtual machine is configured based on analysis of a protocol utilized by the network data.

54. The non-transitory machine readable medium of claim 53, wherein the virtual machine is configured by retrieving the virtual machine according to a packet format of the network data or the protocol utilized by the network data from a virtual machine pool.

55. The non-transitory machine readable medium of claim 24, wherein replayer is configured to communicate with the virtual machine through a virtual switch, the virtual switch simulates a communication network.

56. The non-transitory machine readable medium of claim 24, wherein the replayer simulates a transmission of the network data being a data flow including one or more related data packets.

57. A computerized method comprising:
receiving a first network data from a communication network;
configuring a replayer to dynamically modify session variables and simulate behavior of a device responsible for transmission of the first network data on the communication network, the replayer to transmit modified first network data including at least a portion of the first network data and one or more modified session variables to a virtual machine;
before determining whether the first network data is indicative of a malware attack, transmitting the modified first network data to the virtual machine, the virtual machine being configured to receive the modified first network data and provide a response based on a processing of the modified first network data within the virtual machine; and
analyzing the response by the virtual machine to the modified first network data to determine whether at least the portion of the first network data is indicative of a malware attack.

58. The method of claim 57 further comprising intercepting a second network data based on determining that the first network data is indicative of a malware attack.

59. The method of claim 58, wherein the intercepting of the second network data comprises:
identifying a source internet protocol address of the first network data; and
intercepting the second network data from the communication network transmitted from the source internet protocol address, the second network data being received by the controller subsequent to the first network data.

60. The method of claim 58, wherein the intercepting of the second network data comprises:
identifying a target internet protocol address of the first network data; and
intercepting the second network data from the communication network transmitted to the target internet protocol address.

61. The method of claim 58, further comprising generating an unauthorized activity signature based on determining that at least the portion of the first network data is indicative of a malware attack.

62. The method of claim 61, further comprising:
storing the unauthorized activity signature; and
sending the unauthorized activity signature to another digital device.

63. The method of claim 58, wherein before transmitting the first network data to the virtual machine, analyzing the first network data by applying heuristics or probability analysis to determine if the first network data is suspicious and transmitting the portion of the first network data being the suspicious, first network data to the virtual machine.

64. The method of claim 58, wherein the modified first network data is transmitted between the replayer and the virtual machine over a virtual switch, the virtual switch simulates a communication network.

65. The method of claim 57, wherein the transmitting of the modified first network data to the virtual machine and the analyzing of the response by the virtual machine to the modified first network data is conducted within a private computer network.

66. The method of claim 57, wherein the replayer is configured to dynamically modify the session variables to emulate a protocol sequence.

67. The method of claim 66, wherein the session variables include dynamically assigned ports.

68. The method of claim 66, wherein the session variables include transaction identifiers.

69. The method of claim 57, wherein the virtual machine is configured based on analysis of a packet format of the first network data.

70. The method of claim 57, wherein the virtual machine is configured based on analysis of a protocol utilized by the first network data.

71. The method of claim 69, wherein the virtual machine is configured by retrieving the virtual machine according to the packet format of the first network data or a protocol utilized by the first network data from a virtual machine pool.

72. The method of claim 57, wherein the replayer simulates a transmission of the modified first network data that comprises a data flow including one or more related data packets.

73. A system comprising:
a controller including a digital device that is configured to receive first network data from a communication network, the controller comprising:
a scheduler to initiate configuration of a virtual machine, the virtual machine being configured, at least in part, to correspond in functionality to a destination device targeted to receive the first network data; and
an analysis environment configured to simulate transmission of the first network data to determine whether the first network data is indicative of a malware attack based on monitored behavior of the virtual machine, the analysis environment comprises
a replayer configured to dynamically modify one or more session variables and simulate behavior of a device responsible for transmission of the first network data on the communication network, the replayer to further transmit modified first network data including at least a portion of the first network data and the one or more modified session variables to a virtual machine, and
the virtual machine configured to receive the modified first network data before the system determines whether at least the portion of the first network data is indicative of a malware attack, the virtual machine being further configured to provide a response to the modified first network data while being processed in the virtual machine.

74. The system of claim 73, wherein the analysis environment further comprises an interception module configured to intercept second network data upon determining that at least the portion of the first network data is indicative of a malware attack.

75. The system of claim 74, wherein the interception module is configured to identify a source internet protocol address of the portion of the first network data and intercept the second network data from the communication network transmitted from the source internet protocol address, the second network data being received by the controller subsequent to the first network data.

76. The system of claim 74, wherein the interception module is configured to identify a target internet protocol address of the portion of the first network data and intercept the second network data from the communication network transmitted from the target internet protocol address.

77. The system of claim 73, wherein the analysis environment comprises an analysis module configured to analyze the response of the virtual machine to determine, based on the behavior of the virtual machine, whether the portion of the first network data is indicative of a malware attack.

78. The system of claim 73, further comprising a signature module configured to generate an unauthorized activity signature based on the identification.

79. The system of claim 78, wherein the signature module is further configured to:
store the unauthorized activity signature; and
send the unauthorized activity signature to another digital device different than the controller.

80. The system of claim 73, wherein the controller further comprises a heuristic module configured to analyze the first network data with a heuristic.

81. The system of claim 73, wherein the analysis environment transmits the modified first network data between the replayer and the virtual machine over a virtual switch.

82. The system of claim 73 further comprising a tap configured to copy the first network data from the communication network, wherein the tap and the controller are positioned within a private computer network.

83. The system of claim 73, wherein the replayer of the analysis environment is configured to dynamically modify the session variables to emulate a protocol sequence.

84. The system of claim 83, wherein the session variables include dynamically assigned ports.

85. The system of claim 73, wherein the session variables include transaction identifiers.

86. The system of claim 73, wherein the configuration of the virtual machine of the analysis environment is based on an analysis of a packet format of the first network data.

87. The system of claim 73, wherein the configuration of the virtual machine of the analysis environment is based on an analysis of a protocol utilized by the first network data.

88. The system of claim 87, wherein the configuration of the virtual machine of the analysis environment is performed by retrieving the virtual machine from a virtual machine pool according to a packet format of the first network data or the protocol utilized by the first network data.

89. The system of claim 73, wherein the analysis environment further comprises a virtual switch communicatively coupled to both the replayer and the virtual machine, the virtual switch simulates a communication network that enables communications between the replayer and one or more ports of the virtual machine.

90. The system of claim 73, wherein the replayer of the analysis environment simulates a transmission of the modified first network data being a data flow including one or more related data packets.

* * * * *